United States Patent [19]
Brewer

[11] Patent Number: 5,832,254
[45] Date of Patent: Nov. 3, 1998

[54] SCALABLE RESYNCHRONIZATION OF REMOTE COUNTERS

[75] Inventor: Tony M. Brewer, Plano, Tex.

[73] Assignee: Hewlett-Packard, Co., Palo Alto, Calif.

[21] Appl. No.: 929,416

[22] Filed: Sep. 15, 1997

Related U.S. Application Data

[63] Continuation-in-part of Ser. No. 720,332, Sep. 27, 1996.
[51] Int. Cl.$^6$ ....................................................... G06F 1/12
[52] U.S. Cl. ........................... 395/553; 395/558; 375/356
[58] Field of Search .................................... 395/553, 558, 395/200.48; 375/354, 356

[56] References Cited

U.S. PATENT DOCUMENTS

| | | | |
|---|---|---|---|
| 4,630,291 | 12/1986 | Lankar et al. | 375/356 |
| 5,164,619 | 11/1992 | Luebs | 327/297 |
| 5,361,277 | 11/1994 | Grover | 575/356 |
| 5,384,906 | 1/1995 | Horst | 395/553 |

*Primary Examiner*—Thomas M. Heckler

[57] ABSTRACT

A scalable mechanism operable on a multi-processor, multi-node system to compensate for "skew" in synchronizing topologically remote counters. The skew is caused by different latencies inherent in the system in delivering a synchronization ("sync") pulse to remote counters. The invention permits entry, advantageously at system initialization time, of a parameter defining the counter accuracy that will be visible to software in making counter references. The value of the parameter may be derived from an algorithm advantageously including variables representing, for example, skew-affecting factors such as topological remoteness of the furthest node from the master, and/or the anticipated processing times for processing steps to deliver the sync pulse. The invention is thus scalable. As the topological size and complexity of the system increase, the accuracy value is selected according to the corresponding level of skew expected in the hardware configuration. At the same time, the accuracy value need not be selected any coarser than is required to absorb the skew in the configuration. Counter accuracy for particular hardware configurations is thus optimized. In a preferred embodiment, prescale and synchronizer functionality are combined to allow prescale registers to participate in the counter-rounding process at synchronization time. Software reads the prescale registers down to a predefined, fixed resolution. This is accomplished by software ignoring a fixed number of least significant bits of clock increments in the prescale register. At the same time, synchronizer functionality rounds the prescale register at synchronization time according to the selected counter accuracy described above.

22 Claims, 4 Drawing Sheets

SCALABLE RESYNCHRONIZATION OF REMOTE COUNTERS

RELATED APPLICATIONS

This application is a continuation-in-part of co-pending, commonly assigned U.S. patent application TIME OF CENTURY COUNTER SYNCHRONIZATION USING A SCI INTERCONNECT, Ser. No. 08/720,332, filed Sep. 27, 1996.

TECHNICAL FIELD OF THE INVENTION

This invention relates generally to counter synchronization in multi-processor systems, and more specifically to compensation for "skew" in the synchronization of such counters on a scalable basis according to the size and/or complexity of such systems.

BACKGROUND OF THE INVENTION

In multi-processor systems having multiple nodes, each node typically has a clock counter and each processor on that node reads that clock counter. Unfortunately, each clock driving these counters, and hence each node, runs at a slightly different clock rate. This difference arises as a result of slight differences in clock frequencies, the crystals in each clock being not exactly identical. The different crystal frequencies cause the clocks, and therefore the counters, to drift apart in their measurement of time. The physical differences in the crystals cannot be controlled.

Periodic resynchronization is therefore required. A master clock is typically identified within the system, which in turn sends out a synchronization pulse (hereinafter "sync pulse") to the other clocks to resynchronize with the master.

This resynchronization mechanism is affected directly by the size of the system involved. It takes more time for the sync pulse to reach topologically distant counters than it does to reach topologically nearer counters. This latency would not be so significant if the destination counters were substantially topologically equidistant from the master. Typically, however, a measurable "skew" arises when the sync pulse is distributed to remote clocks, the skew representing the time difference between the maximum latency (for a topologically distant counter) and the minimum latency (for a topologically near counter). This skew increases as the system enlarges physically. This skew further increases as the amount of traffic in the system increases. It just takes longer for a sync pulse to reach topologically remote counters over busy processing connections such as buses or interfaces.

Software running on the system, no matter what size of system, would like all counters in the system to be perfectly synchronous all the time. Software can nonetheless tolerate small variations in counter accuracy, up to a predefined limit. Absent skew, these small variations (usually attributable to marginally different crystal oscillation rates) are correctable through periodic sync pulse distributions from the master clock. However, when the skew in a system exceeds the predefined skew limit for the system, sync pulse distribution cannot correct clock discrepancies by itself. The software further cannot tolerate the discrepancies and errors can occur.

Systems of the prior art, which are often fixed in size and topology, typically account for skew by selecting and implementing a fixed system counter accuracy just once at system design time, where the selected accuracy can be predicted with confidence always to exceed the expected skew. A problem has arisen, however, with the emergence of scalable systems, allowing a system's architecture and topology to be selectively varied from one hardware implementation to the next according to the needs or desires of different users. Clearly, as the system enlarges or becomes more complex, it becomes much harder to predict a single counter accuracy that will always absorb the likely skew in the selected hardware implementation. One solution is to select a single, very coarse accuracy that no matter how large or complex the system gets, will always absorb the expected skew. Selection of such a coarse accuracy also degrades the potential performance of the system, however, by limiting, at the outset, the potential precision with which the system may run. This is particularly disadvantageous for smaller or less complex hardware configurations which must now run on an overly coarse accuracy.

Another solution is to select a finer accuracy and hope that it is still sufficient to absorb the potential skew of a system configured near the maximum scalable capacity of the system. Under this alternative, the system risks loss of counter synchronization in larger and more complex hardware configurations, an event which usually precipitates a processor interrupt and a requirement to re-initialize the system.

There is therefore a need in the art to be able to select system counter accuracies on a scalable basis corresponding to the size and/or complexity of the hardware configuration. An accuracy can then be selected to absorb the skew expected in a particular hardware configuration, while still enabling optimally precise counter accuracy in smaller or less complex systems.

The solution also advantageously should be "invisible" to software, in that counters continue to have a fixed resolution with selectable accuracy. There is also a need in the art to compensate for counter sync pulse skews which may exceed the counter resolution predefined by the system, where such compensation is accomplished without changing the accuracy presented to software.

SUMMARY OF THE INVENTION

The above and other needs are met by a system and method in which counter accuracy is a variable whose value in a particular hardware configuration corresponds to the skew expected in that configuration. In a preferred embodiment, although not mandatorily, the accuracy value is defined to the system at initialization time. Advantageously, the accuracy value is selected according to the result of a skew-calculating algorithm having variables representing skew-affecting parameters (such as system topology or system processing traffic levels, for example).

The present invention is thus scalable. As the topological size and complexity of the system increase, the accuracy value is selected according to the corresponding level of skew expected in the hardware configuration. At the same time, the accuracy value need not be selected any coarser than is required to absorb the skew in the configuration. Counter accuracy for particular hardware configurations is thus optimized.

It will be appreciated that according to the present invention, the resolution of counter references visible to software stays fixed (preset at system design time) while the counter accuracy can be varied to compensate for expected skew. In a preferred embodiment, the software resolution defines a specific bit in a clock-counting register, where software will always identify that bit as the least significant bit in reading a time-of-century ("TOC") counter. Depending on the accuracy value defined to the system at initialization time, however, counters may be rounded at synchronization time to a different bit from this resolution bit. This means that in a system having coarse counter accuracy, the software may see a counter rounded to 1 or more bits greater in significance that the fixed resolution bit. This loss of counter precision to software is nonetheless tolerable in most systems, so long as it is well known and can be taken into account in assessing reliability of counter references. The advantageous "trade-off" against this possible loss of precision is that counter accuracies can be scalably selected to absorb skew.

The inventive counter synchronization mechanism is implemented in a preferred embodiment by enabling a prescale register (which normally just converts clock increments into counter increments) to participate in the counter rounding process at synchronization time. Prescaling and counter synchronization are generally separate operations in systems of the current art, since counter synchronization is generally a function of a fixed counter accuracy value. By allowing the prescale register to participate in the counter synchronization process, however, the software-visible part of the register remains constant, but is subject to the variable-accuracy rounding process described herein.

It is therefore a technical advantage of the present invention to allow for skew in clock synchronization on a scalable basis.

Another technical advantage of the present invention is that compensation for skew is "invisible" to software.

Another technical advantage of the present invention is that in scalable systems, counter accuracy may be traded off on a "sliding scale" against the ability of system synchronization mechanisms to absorb expected skews. Larger and more topologically complex hardware configurations will precipitate larger expected skews, and so counter accuracy may be coarsened to allow counter synchronization mechanisms to absorb such skews without loss of synchronicity. Smaller systems may enjoy a finer counter accuracy corresponding to the smaller expected skew.

A further technical advantage of the present invention is that in a preferred embodiment, a parameter representing counter accuracy may be input at system initialization time to correspond with the expected skew within the system. The parameter may be derived from an algorithm having variables representing skew-affecting factors such as topological size of the system, or expected processing complexity.

The foregoing has outlined rather broadly the features and technical advantages of the present invention in order that the detailed description of the invention that follows may be better understood. Additional features and advantages of the invention will be described hereinafter which forms the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The following description is made with reference to exemplary architecture and topology used in connection with a Hewlett-Packard SPP2000 multi-processor system. This architecture may have as many as 112 nodes. It will nonetheless be understood that the principles of the present invention, as exemplified by the following description of specific aspects of the SPP2000 system architecture, are not limited to such examples, and apply to any architecture in which remote counter synchronization is subject to problems with skew.

Figure 1:
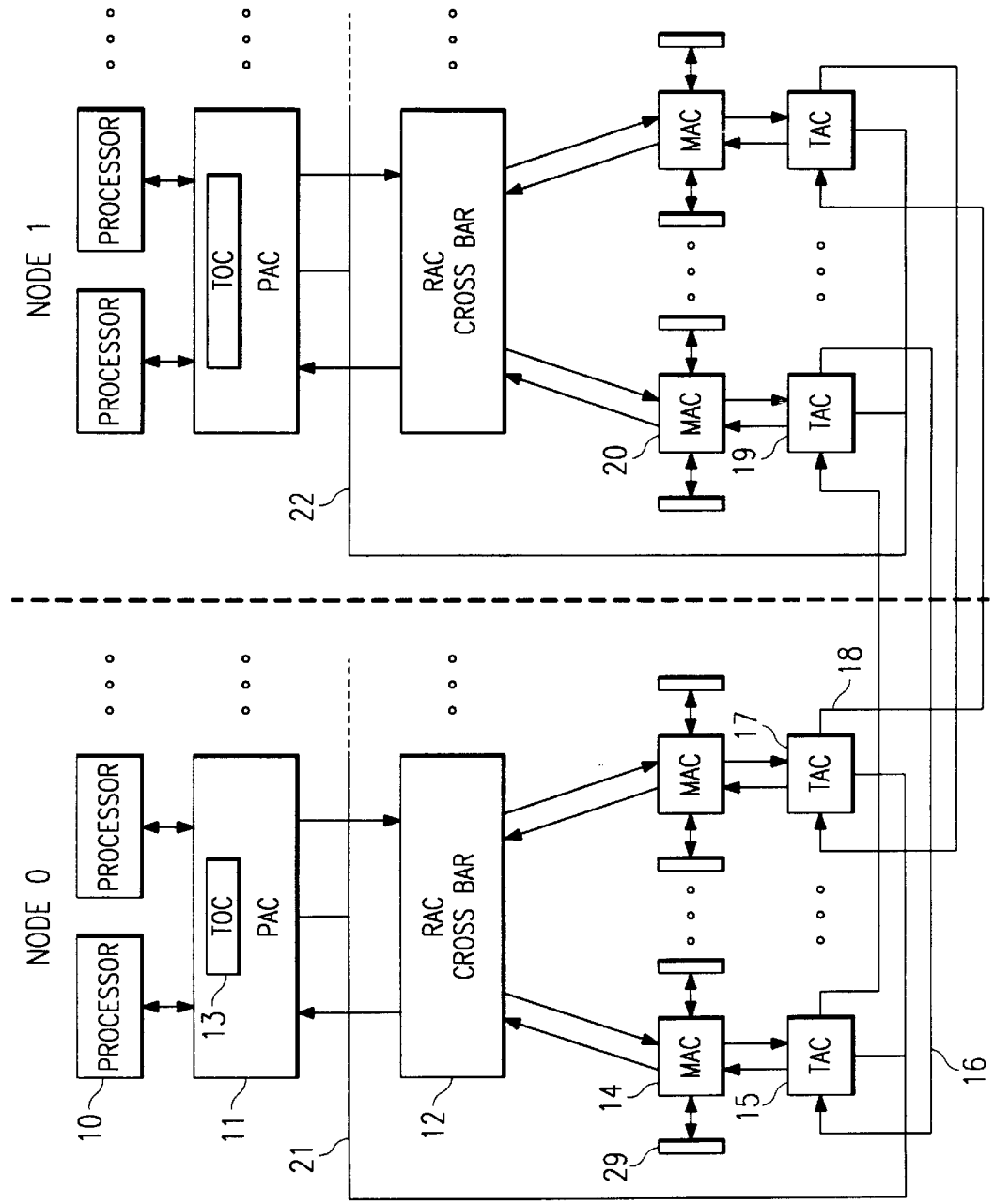
FIG. 1 is a schematic diagram illustrating two nodes within an exemplary architecture and topology on a system on which the present invention may be embodied.
Figure 2:
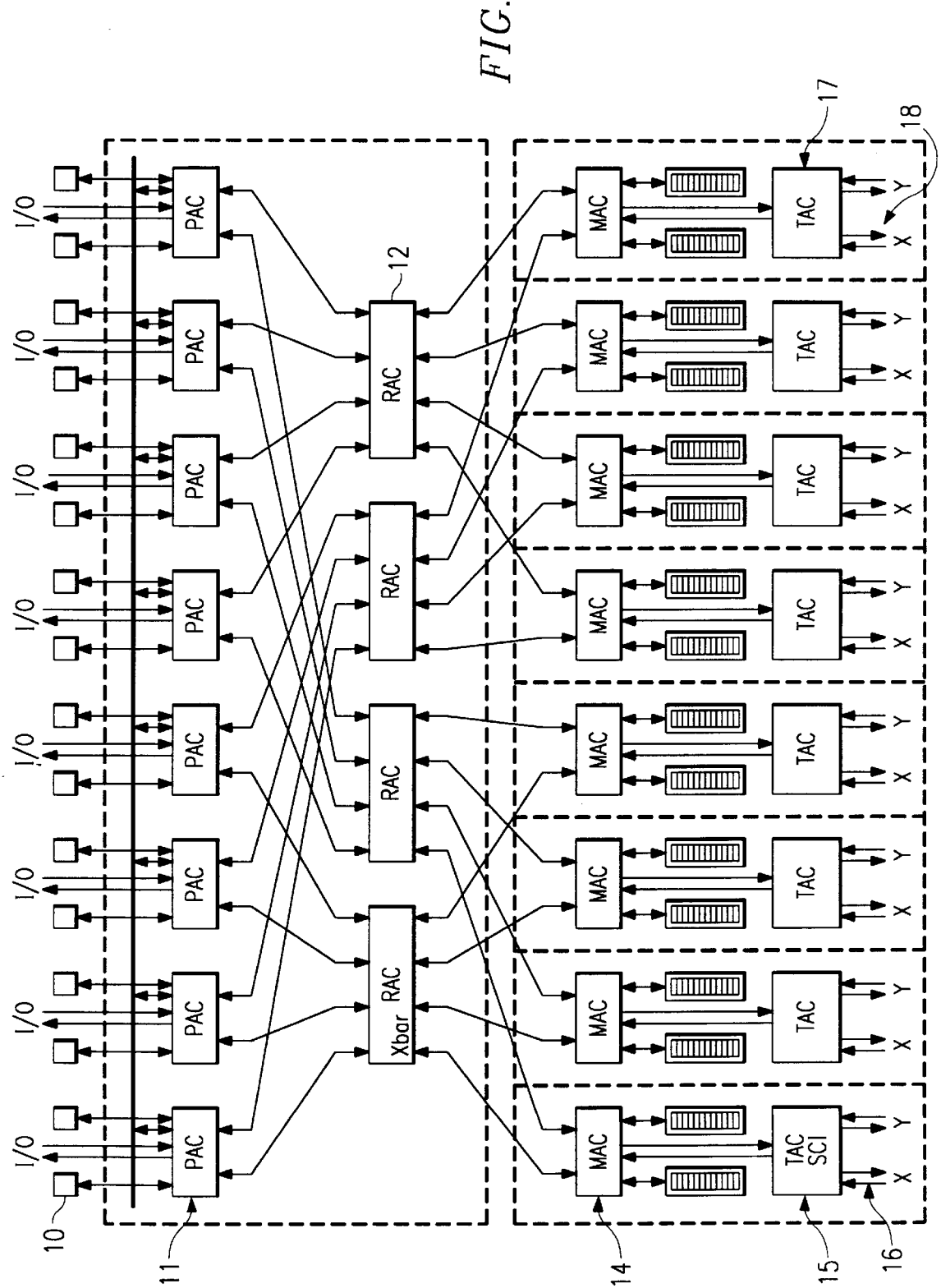
FIG. 2 is a schematic diagram illustrating further exemplary topological interconnection of the architecture of FIG. 1.
Figure 3:
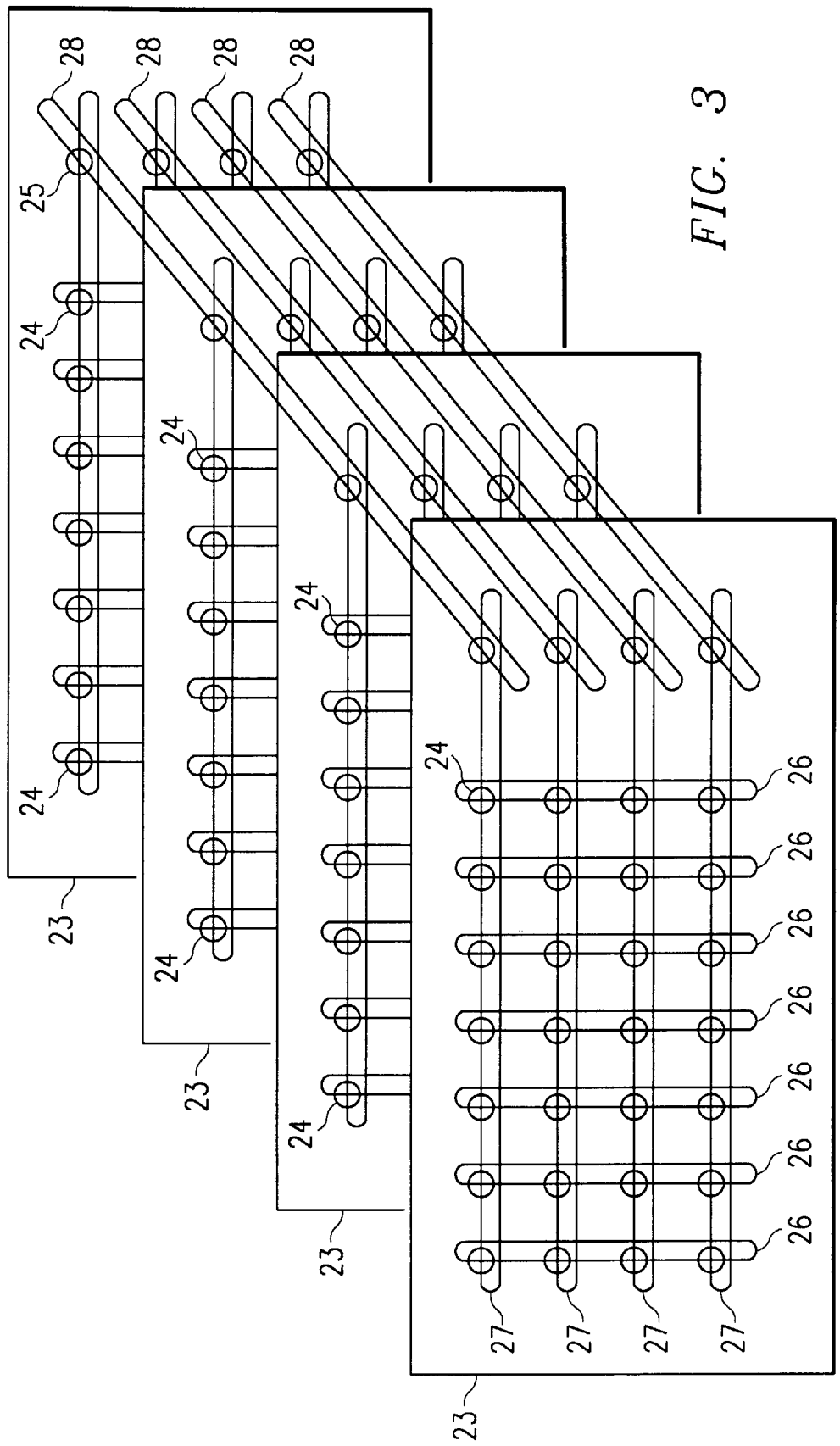
FIG. 3 is a schematic diagram of an exemplary system having 112 nodes.

Turning first to FIG. 1, depicts a schematic overview of the architecture and topology of two nodes in the exemplary SPP2000 multi-processor, specifically nodes 0 and 1. FIG. 2 depicts a single node. FIG. 3 illustrates a 112 node system, in which nodes 24 are organized as seven X-dimension rings 26 by four Y-dimension rings 27 forming a wall 23. Four of such walls are interconnected by four Z-dimension rings 28. A bridge node (not illustrated) is used to connect a Y-dimension ring to a Z-dimension ring. As noted above, it will be appreciated that the topologies illustrated in FIGS. 1, 2 or 3 are exemplary only, and that the present invention applies to other topologies.

Returning to FIG. 1, two processors 10 are advantageously connected to processor agent chip ("PAC") 11. PAC 11 has an input/output (I/O) subsystem and is coupled to cross bar 12.

One function of the PAC 11 is to transmit requests from the processors 10 through the cross bar 12 and to memory access controllers ("MACs") 14, and then to forward the responses back to requesting processor 10. MACs 14 control access to coherent memory. In the exemplary architecture described herein, each MAC 14 supports up to 2 Gbytes in 4 banks, each bank 29 with 512 Mbytes. The memory banks comprise SIMMs of synchronous direct random access memory (SDRAMs).

With continuing reference to FIG. 1, when processor 10 generates a request to access memory or other resource, PAC 11 examines the request address to determine the proper MAC 14 for handling the request, and then PAC 11 sends the request through RAC 12 to the appropriate MAC 14. If the MAC 14 determines the node ID is not to a local memory address, then MAC 14 forwards the request to the ring interface controller (also known as a toroidal access chip, or "TAC") 15. If the MAC 14 determines the request address is on the local node (i.e. controlled by that MAC 14), the MAC 14 accesses the appropriate memory 29.

Each PAC 11 contains a time of century ("TOC") counter 13. This counter counts according to the local clock frequency. Each node has a single crystal clock and the TOCs on the same node operate from that clock. Each processor attached to a PAC 11 has access to TOC 13 with relatively equal latency between the processors, such that if the two different processors read TOC 13 at substantially the same time, each processor reads approximately the same value, or at least within an acceptable tolerance limit.

It is well-known, however, that no two crystals are identical, and minute imperfections and variations in the oscillation rates of supposedly identical clocks cause those clocks to keep time at slightly different rates. In the exemplary architecture described herein, each node has a different clock, and so TOCs 13 operating on the different nodes are likely to be counting at slightly different rates. Accordingly, TOCs 13 throughout an entire system need to be synchronized periodically, such that when a processor on a remote node reads or accesses the memory or other device on the local node, both local and remote TOC references may be expected to be in synchronicity.

Figure 4:
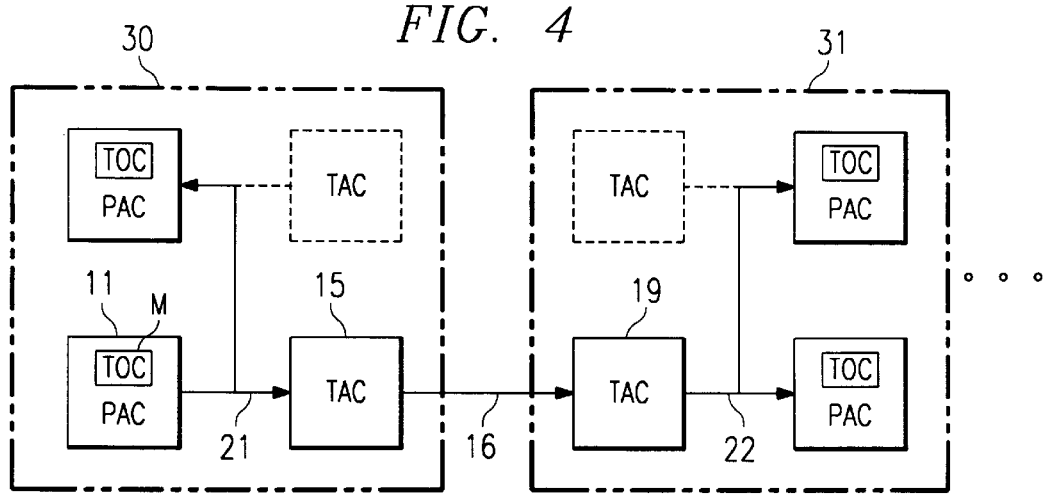
FIG. 4 is a schematic diagram showing the sync pulse distribution arrangement.

It will be further appreciated that synchronization throughout the system must be with respect to a base, or "master" TOC 13. As shown in FIG. 4, a preselected TOC M within a designated PAC 11 on a single node 30, usually node 0, is designated to be the master. The PAC 11 holding master TOC M generates synchronization ("sync") pulses to be sent to other PACs on both local and remote (or "slave") nodes 31 to keep those TOCs on those other PACs in synchronicity with master TOC M.

Designated PAC 11 distributes sync pulses to PACs on the local node 30 via pathway 21, and to remote nodes 31 via pathway 16. In a preferred embodiment, internodal pathway 16 is a Scalable Coherent Interconnect ("SCI") ring, although the present invention is not specific to any particular pathway between nodes. Once the sync pulse is received at remote nodes 31, pathways 22 within those remote nodes deliver the sync pulse to PACs within those nodes.

Figure 5:
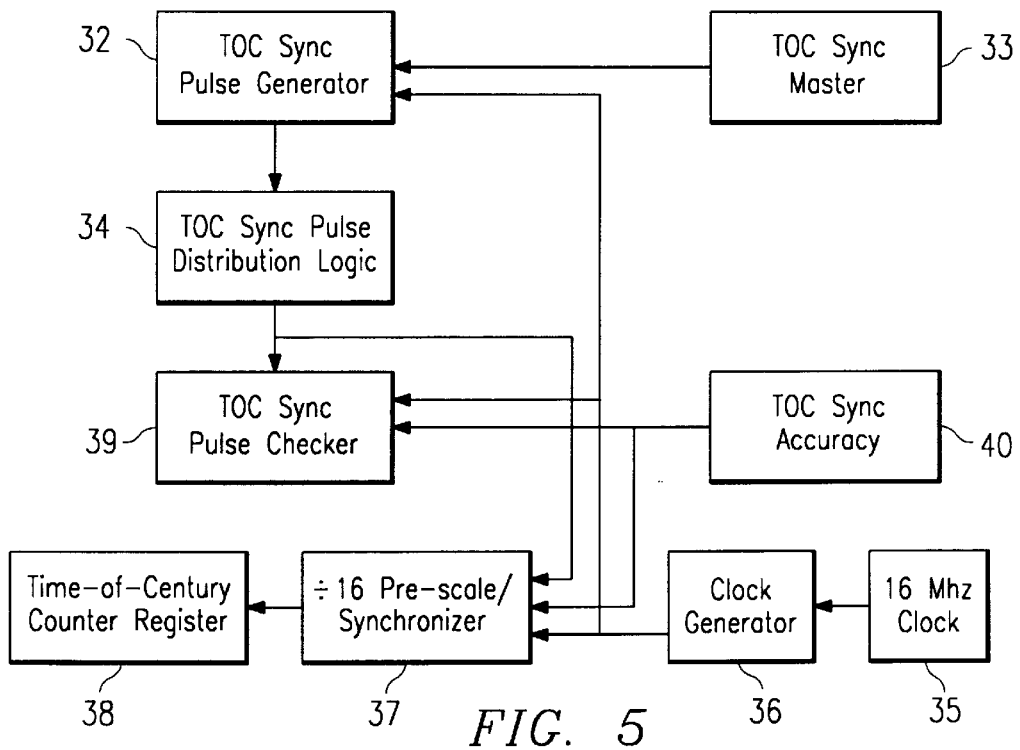
FIG. 5 is a block diagram illustrating processing of sync pulses in accordance with the present invention.

FIG. 5 depicts a block diagram illustrating an exemplary synchronization process used by TOCs 13 shown at each PAC on FIG. 4. In a preferred embodiment, clock 35 and clock generator 36 generate ticks at a rate of 16 MHz. Prescale/synchronizer 37 receives these ticks, and, in a preferred embodiment, divides by 16 to increment TOC counter register 38 at a rate of 1 MHz. This equates to one increment of TOC counter register 38 every $\mu$sec. It will be appreciated that this division-by-16 process is accomplished by (1) prescale/synchronizer incrementing a prescale register with clock ticks, and then (2) software ignoring the four least significant bits in the register in defining the least significant bit of TOC counter references. This prescale operation thus defines a fixed resolution counter visible to software, preset at system design time. In the example above, the fixed resolution visible to software is 1 $\mu$sec.

As discussed above, this TOC counting mechanism needs to be synchronous throughout the system. With momentary reference back to FIG. 4, this is achieved by designating one PAC 11 on one node to have the master TOC M and distributing sync pulses from TOC M to other TOC counters throughout the system.

With reference now to FIG. 5, the sync pulse distribution mechanism at each PAC is responsive to reception of a sync pulse by prescale/synchronizer 37 from TOC sync pulse distribution logic 34. The operation of TOC sync pulse distribution logic 34 depends on whether the local TOC is the master TOC M or not. If it is the master, then TOC sync pulse generator 32 sends a sync pulse to distribution logic 34 at a predetermined interval (in a preferred embodiment every 256 ticks of clock generator 36). If it is not the master, then TOC sync pulse generator 32 is dormant and TOC sync pulse distribution logic 34 receives a pulse from the master located elsewhere on another PAC. TOC sync pulse generator 32 knows whether or not it is the master (and therefore, whether or not to generate a pulse) responsive to a control signal from TOC sync master 33. In a preferred embodiment, TOC sync master 33 is a Control and Status Register ("CSR") bit whose condition ("1" or "0") designates whether or not TOC sync pulse generator 32 is the master, and thus, whether or not it should generate a pulse.

According to the present invention, the sync pulse received by TOC sync pulse distribution logic 34 is then fed to prescale/synchronizer 37 and to TOC sync pulse checker 39. As noted above in the "Summary" section, feeding the sync pulse to prescale functionality in this way is an operation not usually found in current systems. In a preferred embodiment, prescale/synchronizer 37 synchronizes (i.e., resets TOC counter register 38 up or down) according to the information in the sync pulse, and a control signal from TOC sync accuracy 40. The control signal informs prescale/synchronizer 37 of the system's predefined counter accuracy. As will be described below, this accuracy may not be the same as the fixed resolution visible to software. In a preferred embodiment, the predefined counter accuracy can be found in two CSR bits.

According to the present invention, the accuracy ordained by TOC sync accuracy 40 may be varied. Advantageously, the accuracy is set for a particular hardware configuration by assigning a value to a parameter at system initialization time.

Calculation of the parameter's value may be accomplished at system initialization time by reference to an algorithm. The algorithm ideally includes variables representing skew-affecting factors such as topological size and processing complexity of the system. For example, with momentary reference to FIG. 4, in an embodiment in which nodes are linked by an SCI interface, the topological size of a system can be measured in terms of "hops" required to be made by a sync pulse from TAC to TAC in order to travel from master TOC M to the most remote node 31. Other methods of measuring topological remoteness are possible, and the present invention is not limited in this regard.

A second measurable variable contributing to latency in the delivery of a sync pulse is the expected processing time required by the system to perform certain processing steps in delivering a sync pulse. Table 1 below shows exemplary processing times for such steps in a preferred embodiment.

TABLE 1

| Step in delivering sync pulse signal | Expected processing time |
| --- | --- |
| Synchronize core logic clock signal | 1 cycle |
| Synchronize master node sync pulse signal | 2 cycles |
| Synchronize slave node sync pulse signal | 2 cycles |
| 1 TAC hop | 12 cycles |

Other processing steps and/or expected processing times are possible, and the present invention is not limited in this regard. Moreover, cycle time is a variable in itself. In the Hewlett-Packard SPP2000 system used in the preferred embodiment, cycle time is 8.33 nanoseconds ("ns"). This value will vary from system to system on which the present invention is enabled.

Using the parameters suggested above in reference to the SPP2000 system, an exemplary skew-calculating algorithm is $$t = 41.65 + 12n \text{ nanoseconds}$$

where t is the expected level of skew (latency in delivering a sync pulse) and n is the number of TAC hops required to reach the furthest node from the master node.

Other algorithms to determine a level of skew for a delivered sync pulse may also be derived. Additional variables, such as expected clock crystal error may also be used. The present invention is not limited to specific forms or variables in deriving an algorithm to compute an expected level of skew. The results of these calculations, however, may be used to select a corresponding counter accuracy to be held by TOC sync accuracy 40 on FIG. 5 when sending control signals to prescale/synchronizer 37.

Returning now to FIG. 5, it will be seen that prescale/synchronizer is receiving sync pulse information from distribution logic 34, accuracy information from TOC sync accuracy 40, and local clock information from clock generator 36. Prescale/synchronizer 37 is now disposed to synchronize TOC counter register 38 with the master TOC M from FIG. 4. The operation of prescale/synchronizer 37 is in this regard further explained with reference to FIG. 6. Register 601 is a register counting clock ticks. As already noted, in a preferred embodiment, this is at a rate of 16 MHz. Also as already noted, prescale functionality in prescale/synchronizer 37 on FIG. 5 is causing the four least significant bits of register 601 to be invisible to software (i.e., dividing local clock counts by 16). The software thus sees a fixed resolution of 1 $\mu$sec in counter references.

Figure 6:
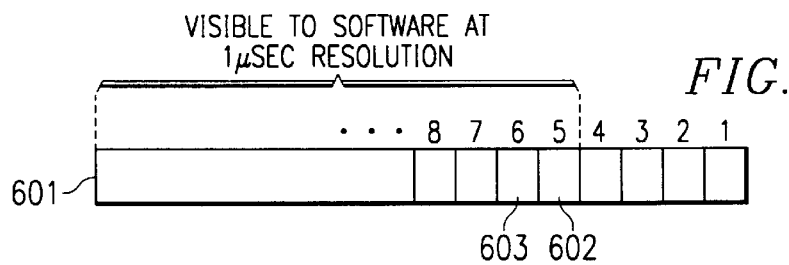
FIG. 6 is a representation of an exemplary register storing clock counts and TOC counts according to the present invention.

Let it now be assumed that the predefined system accuracy ordained by TOC sync accuracy 40 on FIG. 5 is also 1 $\mu$sec. Synchronizer functionality in prescale/synchronizer 37 on FIG. 5 must therefore ensure that at least the fifth bit 602 of register 601 on FIG. 6 is synchronous with other counters in the system. Accordingly, when a sync pulse arrives, prescale/synchronizer 37 rounds the value of register 601 according to the information in the sync pulse. Since fifth bit 602 is the least significant bit in the predefined counter accuracy of 1 $\mu$sec, the four bits to the right of fifth bit 602 represent a "window" of time in which sync pulse delivery time can be affected by skew without affecting the rounded value of fifth bit 602. In a preferred embodiment in which sync pulses are delivered nominally every 16 $\mu$sec in a system governed by a 16 MHz clock, this window is ±7 ticks either side of expected pulse delivery time, which equates to ±437.5 ns. So long as sync pulse continue to be received within this window, the local counters can be expected with confidence to be synchronous with the rest of the system up to the predefined counter accuracy of 1 $\mu$sec.

In this example, the software sees counter references that may be relied upon as synchronous to the same level of accuracy as the fixed counter resolution of 1 $\mu$sec.

Now let it be assumed that the accuracy ordained by TOC sync accuracy 40 on FIG. 5 is 2 $\mu$sec (following entry of a different value for the corresponding parameter at initialization time). In this case, synchronizer functionality in prescale/synchronizer 37 need only ensure that at least the sixth bit 603 of register 601 on FIG. 6 is synchronous with other counters on the system to maintain synchronicity. The "window" in which skew will not affect the accuracy of sixth bit 603 has now increased to five bits, or ±15 ticks either side of expected pulse delivery time.

The compensation for skew thus becomes scalable, trading off accuracy for increased ability to compensate for skew without affecting counter synchronicity or resolution as seen by software. Table 2 below highlights this further by reference to the examples used in the preferred embodiment.

TABLE 2

| Accuracy | Check Range 16 MHz clock Nominal 16 $\mu$sec sync pulse interval |
|---|---|
| 1 $\mu$sec | 256 ± 7 clock ticks (±437.5 ns) |
| 2 $\mu$sec | 256 ± 15 clock ticks (±937.5 ns) |
| 4 $\mu$sec | 256 ± 31 clock ticks (±1.938 $\mu$sec) |

In this example of an accuracy value of 2 $\mu$sec, however, the software is still looking at register 601 on FIG. 6 with a resolution of 1 $\mu$sec (i.e., ignoring the four least significant bits). The precision of counter accuracy seen by software is thus less reliable, since the counter has been rounded at synchronization time to bit 603, which is the second bit in significance visible to software. As noted above, this potential loss of precision is nonetheless tolerable in systems where the loss is predefined, known about and accountable for. The inventive mechanism has allowed skew to be absorbed as a "trade off" for this potential loss of precision.

It will be seen that although the invention is described above with reference to two examples of clock accuracy, the invention will apply to any selected accuracy. The coarser the accuracy selected, the less precise the counter references seen by software will tend to be. The finer the accuracy selected, the more precise they will tend to be. Of course, when an accuracy selected is so fine that counter synchronization accuracy exceeds the fixed counter resolution seen by software, the system will continue to run to the precision of the fixed counter resolution.

Completing the discussion of FIG. 5, TOC sync pulse checker 39 ensures that the accuracy ordained by TOC sync accuracy 40 is within the skew seen by the system. TOC sync accuracy 40 informs pulse checker 39 of the predefined resolution. Pulse checker 39 makes sure that successive sync pulses arrive within the corresponding "window" as illustrated above in Table 2. Upon detection of sync pulse arrival outside of the window, pulse checker 39 sends an interrupt to the processor informing the processor of the error condition. Generally, reinitialization of the system will be required, with perhaps selection of a coarser accuracy for TOC sync accuracy 40, or possibly system analysis for a broken wire or excessive noise on sync pulse delivery pathways.

The preceding description has disclosed the invention with reference to a scalable mechanism for compensating for skew on a system-by-system basis. Consistent with the present invention, it will be appreciated that a second embodiment will allow scalable selection of counter accuracy on a node-by-node basis, according to levels of skew expected within those nodes.

It will be appreciated that the present invention may be embodied on software executable on a general purpose computer having a central processing unit, a memory, and a mass storage device.

Although the present invention and its advantages have been described in detail, it should be understood that various changes, substitutions and alterations can be made herein without departing from the spirit and scope of the invention as defined by the appended claims.

I claim:

1. A method for compensating for counter synchronization skew on a scalable basis in a multiprocessor computer system, the method comprising the steps of:

(a) predefining a fixed counter resolution seen by software in a system;

(b) selecting a counter accuracy corresponding to a counter synchronization skew level expected in the system, the counter accuracy selected independent of said predefinition of the counter resolution, the counter accuracy further selected to be sufficiently coarse to be unaffected by said expected counter synchronization skew level;

(c) synchronizing counters within the system to the selected counter accuracy; and (d) causing said software to make counter references to the predefined resolution regardless of the selected counter accuracy.

2. The method of claim 1, in which step (a) is performed at system design time.

3. The method of claim 1, in which step (b) is performed at system initialization time.

4. The method of claim 1, in which the selected counter accuracy is a parameter derived from an algorithm, the algorithm including at least one variable whose value corresponds to quantification of a skew-affecting condition within the system.

5. The method of claim 4, in which the skew-affecting condition is selected from the group consisting of:

(a) physical size of the system;

(b) volume of processing traffic within the system; and (c) topological complexity of the system.

6. The method of claim 4, in which the algorithm is:

$$t = 41.65 + 12\,n \text{ nanoseconds}$$

where t is an expected level of skew and n is a value representing the distance between a master node to a furthest topologically remote node therefrom.

7. The method of claim 1, in which the counter accuracy is selected in step (b) with sufficient coarseness to create an unsynchronized time window either side of sync pulses in excess of said counter synchronization skew level.

8. A method for compensating for counter synchronization skew on a scalable basis in a multiprocessor computer system, the method comprising the steps of:

(a) predefining, at system design time, a fixed counter resolution seen by software in a system;

(b) selecting, at system initialization time, a parameter representing a counter accuracy corresponding to a counter synchronization skew level expected in the system, the selected parameter derived from an algorithm including at least one variable whose value corresponds to quantification of a skew-affecting condition within the system selected from the group consisting of:

(i) physical size of the system;

(ii) volume of processing traffic within the system; and (iii) topological complexity of the system; the parameter selected independent of said predefinition of the counter resolution, the counter accuracy represented by the selected parameter having sufficient coarseness to create an unsynchronized time window either side of sync pulses in excess of said counter synchronization skew level;

(c) synchronizing counters within the system to the counter accuracy represented by the parameter; and (d) causing said software to make counter references to the predefined resolution regardless of the counter accuracy represented by the selected parameter.

9. A system for compensating for counter synchronization skew on a scalable basis in a multiprocessor computer system, the system comprising:

means for predefining a fixed counter resolution seen by software in a multiprocessor computer;

means for selecting a counter accuracy corresponding to a counter synchronization skew level expected in the computer, the means for selecting operable independent of the means for predefining, the counter accuracy selected by the means for selecting being sufficiently coarse to be unaffected by said expected counter synchronization skew level;

means for synchronizing counters within the computer to said selected counter accuracy; and means for causing said software to make counter references to the predefined resolution regardless of said selected counter accuracy.

10. The system of claim 9, in which the means for predefining is operable at system design time.

11. The system of claim 9, in which the means for selecting is operable at system initialization time.

12. The system of claim 9, in which the selected counter accuracy is a parameter derived from an algorithm, the algorithm including at least one variable whose value corresponds to quantification of a skew-affecting condition within the computer.

13. The system of claim 12, in which the skew-affecting condition is selected from the group consisting of:

(a) physical size of the computer;

(b) volume of processing traffic within the computer; and (c) topological complexity of the computer.

14. The system of claim 12, in which the algorithm is:

$$t = 41.65 + 12\,n \text{ nanoseconds}$$

where t is an expected level of skew and n is a value representing the distance between a master node to a furthest topologically remote node therefrom.

15. The system of claim 9, in which the means for selecting selects a counter accuracy with sufficient coarseness to create an unsynchronized time window either side of sync pulses in excess of said counter synchronization skew level.

16. A computer program product including computer readable logic recorded thereon for compensating for counter synchronization skew on a scalable basis in a multiprocessor computer system, the computer program product comprising:

a computer-readable storage medium; and a computer program stored on the computer-readable storage medium, the computer program comprising:

means for predefining a fixed counter resolution seen by software in a multiprocessor computer;

means for selecting a counter accuracy corresponding to a counter synchronization skew level expected in the computer, the means for selecting operable independent of the means for predefining, the counter accuracy selected by the means for selecting being sufficiently coarse to be unaffected by said expected counter synchronization skew level;

means for synchronizing counters within the computer to said selected counter accuracy; and means for causing said software to make counter references to the predefined resolution regardless of said selected counter accuracy.

17. The computer program product of claim 16, in which the means for predefining is operable at system design time.

18. The computer program product of claim 16, in which the means for selecting is operable at system initialization time.

19. The computer program product of claim 16, in which the selected counter accuracy is a parameter derived from an algorithm, the algorithm including at least one variable whose value corresponds to quantification of a skew-affecting condition within the computer.

20. The computer program product of claim 19, in which the skew-affecting condition is selected from the group consisting of:

(a) physical size of the computer;
(b) volume of processing traffic within the computer; and
(c) topological complexity of the computer.

21. The computer program product of claim 19, in which the algorithm is:

$$t = 41.65 + 12\,n \text{ nanoseconds}$$

where t is an expected level of skew and n is a value representing the distance between a master node to a furthest topologically remote node therefrom.

22. The computer program product of claim 16, in which the means for selecting selects a counter accuracy with sufficient coarseness to create an unsynchronized time window either side of sync pulses in excess of said counter synchronization skew level.

* * * * *